US012637988B2

(12) United States Patent
Guerrato et al.

(10) Patent No.: US 12,637,988 B2
(45) Date of Patent: May 26, 2026

(54) FUEL SYSTEM FOR A POWER PLANT

(71) Applicant: PHINIA DELPHI LUXEMBOURG SARL, Belvaux (LU)

(72) Inventors: Diego Guerrato, Gillingham (GB); Neil Wilson, Rochester (GB)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 18/685,893

(22) PCT Filed: Aug. 23, 2022

(86) PCT No.: PCT/EP2022/073517
§ 371 (c)(1),
(2) Date: Feb. 22, 2024

(87) PCT Pub. No.: WO2023/025821
PCT Pub. Date: Mar. 2, 2023

(65) Prior Publication Data

US 2024/0352899 A1 Oct. 24, 2024

(30) Foreign Application Priority Data

Aug. 23, 2021 (GB) ..................................... 2112038

(51) Int. Cl.
*F02D 41/00* (2006.01)
*F02D 19/02* (2006.01)
*F02D 19/06* (2006.01)

(52) U.S. Cl.
CPC ....... *F02D 41/0027* (2013.01); *F02D 19/022* (2013.01); *F02D 19/0644* (2013.01)

(58) Field of Classification Search
CPC ............... F02D 41/0027; F02D 19/022; F02D 19/0644; F17C 2201/018; F17C 2201/056;

(Continued)

(56) References Cited

U.S. PATENT DOCUMENTS

2014/0245995 A1* 9/2014 Deliyski ............. F02D 19/0613 123/456
2016/0238194 A1* 8/2016 Adler ........................ F17C 1/00

(Continued)

FOREIGN PATENT DOCUMENTS

CA 2630927 C * 8/2015 .............. F02B 69/02
DE 29816811 U1 10/1999

(Continued)

OTHER PUBLICATIONS

International Search Report for PCT/EP2022/073517 dated Dec. 5, 2022, 3 pages.

(Continued)

*Primary Examiner* — Grant Moubry
*Assistant Examiner* — Ruben Picon-Feliciano
(74) *Attorney, Agent, or Firm* — WARNER NORCROSS + JUDD LLP

(57) ABSTRACT

A fuel system for supplying gaseous fuel to an onboard power plant of a vehicle, the fuel system comprising at least a first tank configured to receive pressurised gaseous fuel for supply to the power plant, in use; a source of auxiliary control fluid for supply to the first tank; and a valve arrangement which is operable to control the supply of auxiliary control fluid to the first tank so as to control the discharge of the gaseous fuel from the first tank; wherein the first tank includes a movable separation element for separating the auxiliary control fluid from the gaseous fuel within the first tank.

7 Claims, 8 Drawing Sheets

(58) Field of Classification Search
CPC ........ F17C 2205/0142; F17C 2221/012; F17C 7/00; F17C 2223/0123; F17C 2223/036; F17C 2225/0123; F17C 2227/0192; F17C 2265/066; F17C 2270/0168; F17C 5/06; F17C 13/04; F17C 2227/01; F17C 2270/0139; F17C 2270/0178; B60K 2015/03019; B60K 2015/03026; B60K 2015/03315; B60K 15/03006; Y02T 10/30; F02M 21/0206; F02M 21/0221; F02M 21/023; F02M 21/0224
See application file for complete search history.

(56) References Cited

U.S. PATENT DOCUMENTS

| | | | | |
|---|---|---|---|---|
| 2018/0119882 | A1* | 5/2018 | Allidieres | F17C 13/025 |
| 2022/0243673 | A1* | 8/2022 | Khosravi | F02D 19/022 |

FOREIGN PATENT DOCUMENTS

| | | | | |
|---|---|---|---|---|
| DE | 102007004456 A1 | 7/2008 | | |
| EP | 3511570 A1 | 7/2019 | | |
| GB | 2593538 A | 9/2021 | | |
| WO | WO-2013056295 A1 * | 4/2013 | | F17C 5/06 |

OTHER PUBLICATIONS

Machine assisted English translation of DE102007004456A1 obtained from https://worldwide.espacenet.com/patent on Feb. 21, 2024, 11 pages.
Machine assisted English translation of DE29816811U1 obtained from https://worldwide.espacenet.com/patent on Feb. 21, 2024, 8 pages.
Machine assisted English translation of EP3511570A1 obtained from https://worldwide.espacenet.com/patent on Feb. 21, 2024, 17 pages.

* cited by examiner

FUEL SYSTEM FOR A POWER PLANT

CROSS-REFERENCE TO RELATED APPLICATIONS

This application is the U.S. National Stage of International Application No. PCT/EP2022/073517 filed on 23 Aug. 2022, which claims priority to and all advantages of United Kingdom Application No. 2112038.1 filed on 23 Aug. 2021, the contents of which are incorporated herein by reference.

FIELD OF THE INVENTION

This invention relates to a fuel system for supplying gaseous fuel to a gaseous-fueled power plant. In particular, but not exclusively, the invention relates to a fuel system which uses hydrogen as the source of fuel to be supplied to a power plant in the form of an internal combustion engine. The internal combustion engine may form a part of a gas-fueled vehicle.

BACKGROUND

There is an increasing drive in modern technology areas to move away from fossil fuels as a source of energy and to replace them with renewable energy sources. One notable development in recent years has been the development of electric vehicles where the fuel tank of the traditional internal combustion engine is replaced with a battery. However, current electric vehicle technologies have not achieved an energy density from the battery which is comparable with that achieved using traditional fuels (e.g. gasoline, diesel). Furthermore, such systems are limited with their range of travel which does not suit all user requirements, and for heavy duty applications where the size of the battery is impractical.

One alternative to these systems is to use a traditional internal combustion engine (ICE) but running on ecologically produced hydrogen gas. Such systems have been proposed in the art, but there are various efficiency concerns over those solutions and commercially viable options for such "hydrogen ICE" systems remain a challenge. One problem is that, for system efficiency, the hydrogen needs to be injected at pressures considerably higher than atmospheric pressure, which poses technical challenges for existing tank and injector designs.

Other gaseous fuels are also known for use in generating motive power, including compressed natural gas (CNG). Fuel cell technology, which relies on the ionisation of hydrogen within an electrolyte to generate electricity, is also well known for use in vehicles. Both systems require a source of gaseous fuel to generate motive power for the vehicle.

It is against this background that the invention has been devised.

STATEMENTS OF INVENTION

According to the present invention, there is provided a fuel system for supplying gaseous fuel to a power plant of a vehicle such as an onboard fuel system, the fuel system comprising at least a first tank configured to receive pressurised gaseous fuel for supply to the power plant, in use; a source of auxiliary control fluid for supply to the first tank; and a valve arrangement which is operable to control the supply of auxiliary control fluid to the first tank so as to control the discharge of the gaseous fuel from the first tank to the power plant; wherein the first tank includes a movable separation element for separating the auxiliary control fluid from the gaseous fuel within the first tank.

The invention provides a convenient, compact and lightweight fueling system which is readily compatible with an onboard vehicle application where weight and size considerations are paramount.

The fuel system is particularly useful when applied to a power plant in the form of an internal combustion engine of a vehicle. The gaseous fuel is preferably hydrogen gas.

As the power engine consumes fuel, the initial pressure within the first tank is insufficient to discharge gaseous fuel to the power plant, and the gaseous fuel must be mechanically forced from the first tank by means of the auxiliary control fluid. The auxiliary control fluid may be supplied to the first tank by means of a pressuring means in the form of a pump. The auxiliary control fluid then displaces the gaseous fuel to the power plant at approximately constant temperature and without wasteful generation of heat. Since the auxiliary control fluid being pumped has a limited change in volume, the volumetric efficiency of the pump is very high and the overall size of the pump is minimised.

The fuel system may comprise at least one further tank configured to receive pressurised gaseous fuel, and wherein the valve arrangement is operable to control the supply of auxiliary fluid to the or each further tank so as to control the discharge of the gaseous fuel from the or each further tank.

The valve arrangement may include, for each of the first and further tanks, an inlet one-way valve for controlling the supply of auxiliary control fluid to the associated tank and an outlet one-way valve for controlling the supply of auxiliary control fluid from the associated tank to an auxiliary fluid reservoir.

The separation element may include any one of a membrane, a bladder, a diaphragm, a piston or a bellows arrangement.

The fuel system may further comprise an auxiliary control fluid supply line between the source of auxiliary control fluid and the first tank. The pressurising means, to pressurise the supply of auxiliary control fluid to at least the first tank, is located within the auxiliary control fluid supply line.

At least the first tank may be provided with a biasing means which acts on the separation member to oppose movement thereof during a filling phase of the fuel system so as to store energy within the biasing means for use during a discharge phase of gas from the first tank. The biasing means may take the form of a spring which acts on a separation element in the form of a piston, for example.

According to another aspect, the invention relates to a method of delivering gaseous fuel from at least a first tank containing pressurised gaseous fuel to a power plant of a vehicle such as an onboard fuel system, the method comprising controlling a valve arrangement to control the supply of auxiliary control fluid to the first tank so as to cause discharge of the gaseous fuel from the first tank whilst maintaining separation between the auxiliary fluid and the gaseous fuel within the first tank by means of a movable separation element.

It will be appreciated that the various features of the first aspect of the invention are equally applicable to, alone or in appropriate combination, the second aspect of the invention also.

BRIEF DESCRIPTION OF THE DRAWINGS

The above and other aspects of the invention will now be described, by way of example only, with reference to the accompanying drawings, in which.

SPECIFIC DESCRIPTION

Figure 1:
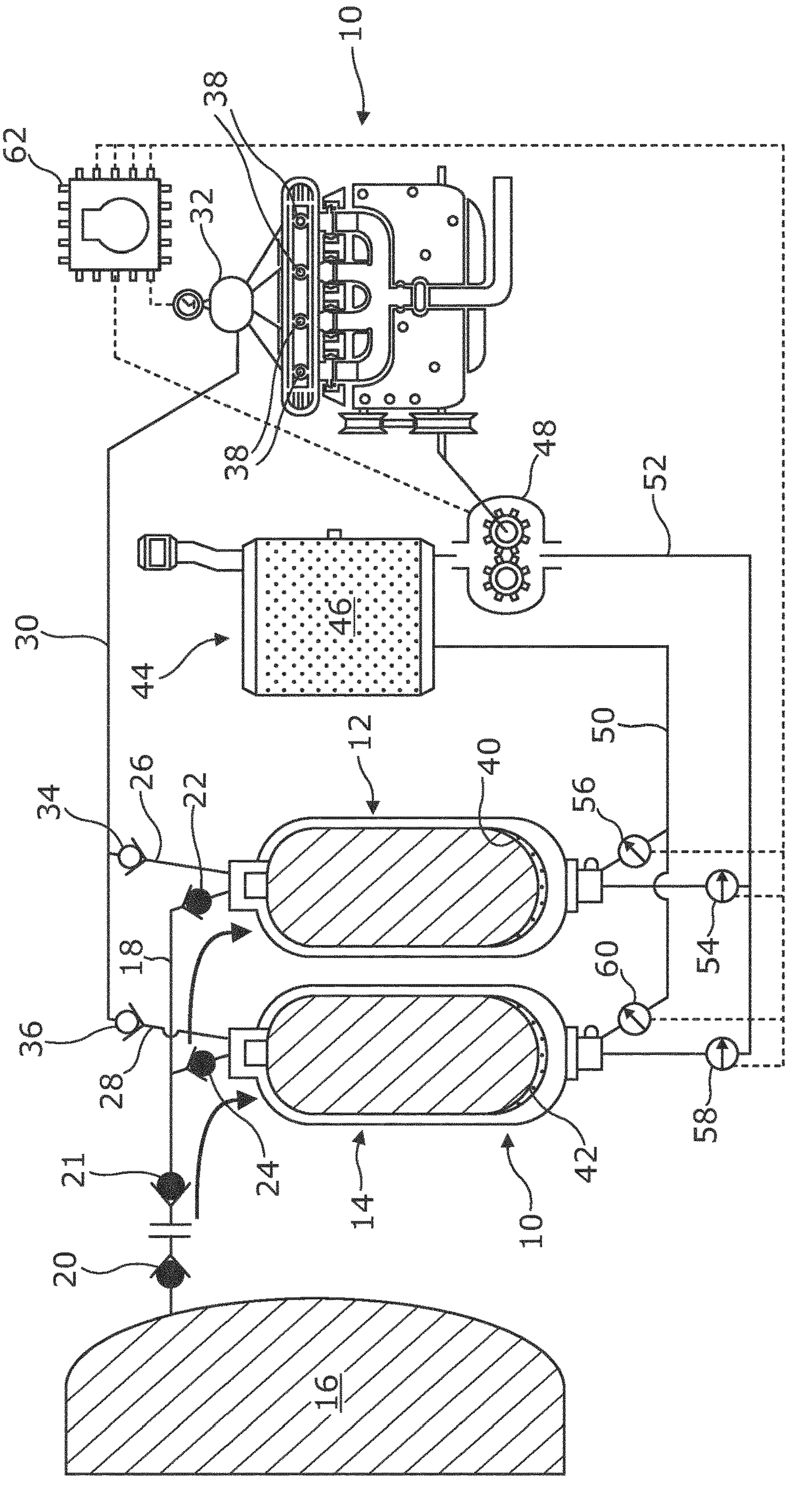
FIG. 1 is a schematic illustration of a fuel system in accordance with a first embodiment of the invention.

The present invention relates to the use of pressurised gaseous fuel to generate power within a power plant, such as an engine, of a vehicle. One specific example of such a fuel system is shown in FIG. 1 which shows an onboard fuel system for use in supplying pressurised hydrogen gas to an internal combustion engine, referred to generally as 10, of a vehicle.

The fuel system includes a tank array including at least a first tank 12. In the embodiment shown, the fuel system includes at least a first tank 12 and a second tank 14 configured to receive gaseous hydrogen from a supply tank 16 at a refueling station. The first tank 12 is connected via a supply line 18 to the supply tank 16 and the second tank 14 is connected via the supply line 18 to the supply tank 16. The supply tank 16 has a supply non-return valve 20 which is operable to open only when a fuel system is connected to the supply tank 16 for refilling. The supply line 18 is also provided with a supply inlet non-return valve 21 which ensures the system (i.e. the supply line 18) remains closed when it is detached from the supply tank 16 at the refueling station.

The supply line 18 from the supply tank 16 has two branches, one into the first tank 12 and one into the second tank 14. The branch to the first tank 12 is provided with a first tank inlet non-return valve 22 which is operable to control the pressure of gas within the first tank 12 when the supply tank 16 is connected to the first tank 12. When the pressure of hydrogen gas within the supply tank 16 exceeds that within the first tank 12, the first tank inlet non-return valve 22 is caused to open to allow hydrogen gas to flow into the first tank 12. The first tank inlet non-return valve 22 closes when the pressure of hydrogen gas within the first tank 12 equalizes with that of the supply tank 16 and the first tank 12 is full. Likewise, the branch to the second tank 14 is provided with a second tank inlet non-return valve 24 which is operable to control the pressure of gas within the second tank 14. When the pressure of hydrogen gas within the supply tank 16 exceeds that within the second tank 14, the second tank inlet non-return valve 24 is caused to open to allow hydrogen gas to flow into the second tank 14. The second tank inlet non-return valve 24 closes when the pressure of hydrogen gas within the second tank 14 equalizes with that of the supply tank 16 and the second tank 14 is full.

In FIG. 1, both the first tank 12 and the second tank 14 are full of hydrogen gas at the end of the system filling phase.

Each of the first and second tanks 12, 14 is also provided with a respective outlet line, 26, 28, which connects the respective tank to a supply line 30 for a fuel rail 32 for receiving pressurised hydrogen gas from the tanks 12, 14. An outlet non-return valve 34, 36, respectively, is provided for each tank within the associated outlet line 26, 28. A first tank outlet non-return valve 34 is associated with the first tank 12 and a second tank outlet non-return 36 valve is associated with the second tank 14. The outlet non-return valves 34, 36 are operable to open when the pressure of hydrogen gas in the associated tank 12, 14 exceeds the pressure of hydrogen gas within the common outlet line 30 (and hence the fuel rail 32) but they prevent the return flow of pressurised hydrogen gas from the fuel rail 32 to the first and second tanks 12, 14.

Typically, the hydrogen gas that is supplied from the supply tank at the refueling station is pressurised to a level of either 350 bar or 700 bar, or at a level between these two levels. The fuel rail 32 is configured to deliver gaseous hydrogen to a plurality of fuel injectors 38 of the fuel system. In the embodiment shown the fuel system includes four injectors, each corresponding to a respective cylinder (not shown) of the engine. The injectors inject the hydrogen fuel at an injection pressure $P_i$, which is typically less than the storage pressure $P_s$.

Each of the first and second tanks 12, 14 is identical internally and includes a separation member in the form of a movable membrane, referred to as the first and second tank membranes 40, 42. Considering the first tank 12, a first tank membrane 40 is movable depending on the presence of an auxiliary control fluid that is supplied to the first tank 12 via an auxiliary control fluid delivery system, referred to generally as 44. Likewise, a second tank membrane 42 is associated with the second tank 14 and is movable depending on the presence of an auxiliary fluid supplied to the second tank 14 by the auxiliary control fluid delivery system 44.

The auxiliary control fluid delivery system includes an auxiliary supply tank (referred to as the auxiliary tank 46) containing an auxiliary control fluid such as liquid oil, pressurising means in the form of a pump 48, an auxiliary control fluid pipeline (comprising an auxiliary control fluid supply line 52 and an auxiliary control fluid return line 50) and a valve arrangement for controlling the supply of auxiliary fluid to the tank array 12, 14. The auxiliary control fluid is considered to be a control fluid, for reasons that will become clear from the following description.

The pump 48 is located in the auxiliary control fluid supply line 52 and both the auxiliary control fluid supply 52 and return 50 lines are in fluid communication with a sole inlet/outlet port of the auxiliary tank 46. The pump 48 is driven by a crank or shaft whose motion is coupled to that of a corresponding crank or shaft of the internal combustion engine. In other embodiments, the pump 48 may be electrically driven.

The valve arrangement includes four valves, two of which 54, 56 are associated with the first tank 12 and two of which 58, 60 are associated with the second tank 14. For the first tank 12, a first inlet one-way valve 54 controls the supply of auxiliary control fluid between the auxiliary tank 46 and the first tank 12 along the auxiliary control fluid supply line 52 and a first outlet one-way valve 56 controls the return flow of auxiliary fluid from the first tank 12 to the auxiliary tank 46 along the auxiliary control fluid return line 50. Likewise, for the second tank 14, a second inlet one-way valve 58 controls the supply of auxiliary control fluid between the auxiliary tank 46 and the second tank 14 along the auxiliary control fluid supply line 52 and a second outlet one-way valve 60 controls the return flow of auxiliary fluid from the second tank 14 to the auxiliary tank 46 along the auxiliary fluid return line 50. By way of example, the auxiliary control fluid may take the form of oil.

The four valves 54, 56, 58, 60 of the valve arrangement are controlled by means of an electronic control unit (ECU) 62, as indicated by the electrical connections shown in dashed lines. Likewise, the ECU 62 controls the pump 48 which pressurises the auxiliary control fluid for supply to the first and second tanks 12, 14, as further illustrated by the electrical connections shown in dashed lines.

In the configuration shown in FIG. 1, the first and second tanks 12, 14 have just been re-filled at the refueling station such that both the first and second tanks 12, 14 are full of hydrogen gas. In each of the fuel tanks 12, 14, the gas is separated from the oil by the associated membrane 40, 42 which is movable within the associated tank depending on the quantity of oil supplied to the tank from the auxiliary tank 46.

The method of operation of the fuel system will now be described with reference to FIGS. 2 to 6.

Figure 2:
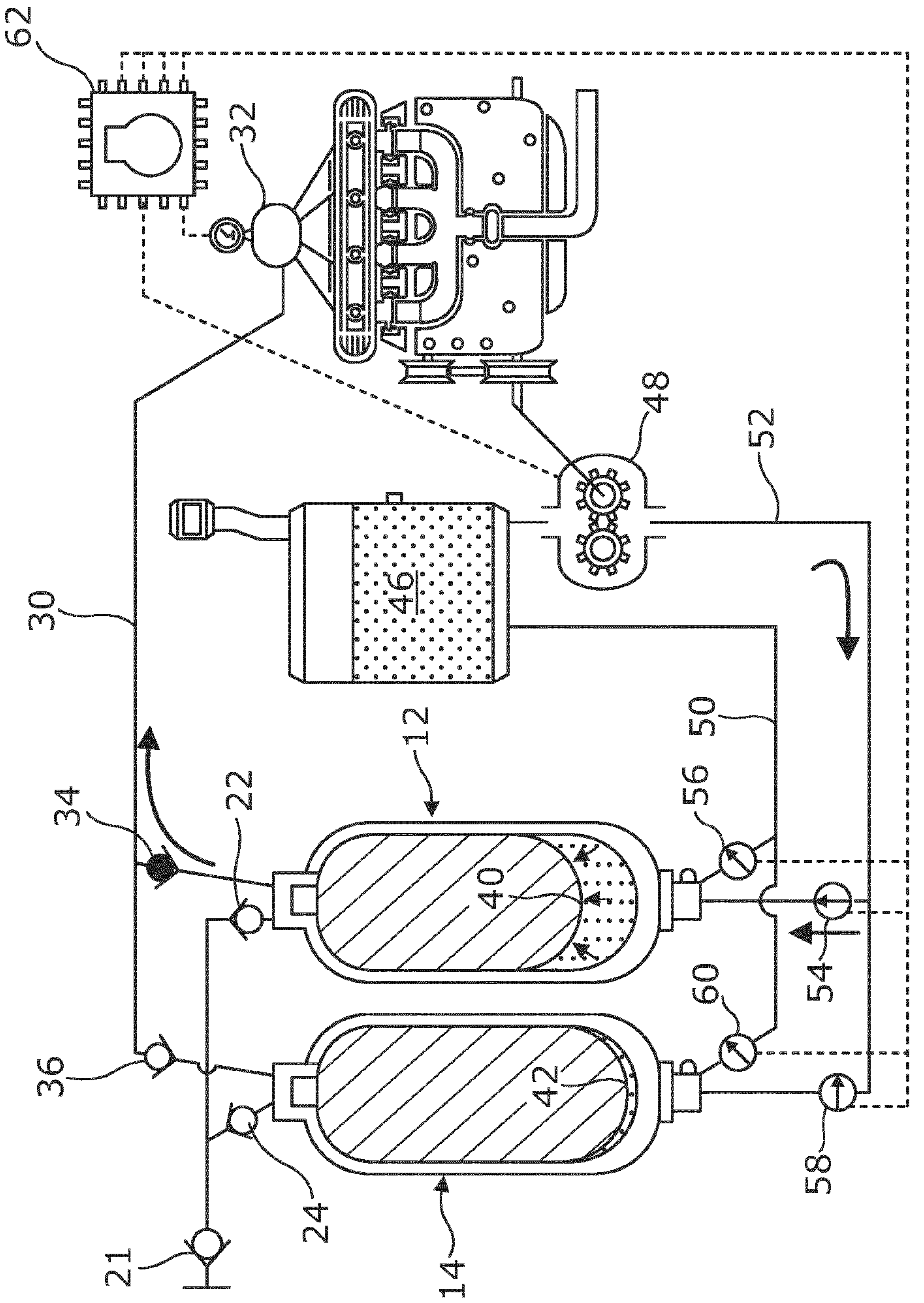
FIGS. 2 to 6 are schematic illustrations of the fuel system in FIG. 1 to illustrate various method steps of operation of the system.

FIG. 2 shows the fuel system having been detached from the re-fueling system.

Initially, hydrogen gas can be supplied to the injectors without the intervention of the auxiliary control fluid delivery system, since the pressure of hydrogen gas in the first and second tanks and the common outlet line and fuel rail exceeds the injection pressure $P_i$. As fuel is supplied to the injectors from the fuel rail, the pressure of hydrogen gas in the fuel rail and common outlet line decreases. This causes the first and second tank outlet non-return valves to open to allow the pressure of hydrogen to equalize between the first and second tanks and the common outlet line and fuel rail. Eventually, as more hydrogen gas is supplied from the first and second tanks, the pressure in the first and second tanks and in the common outlet line and the fuel rail decreases to match the injection pressure $P_i$. At this point, the injectors cannot be supplied with hydrogen gas without the assistance of the auxiliary control fluid delivery system.

In FIG. 2, the fuel system has been detached from the re-fueling system (supply tank 16) and the first tank 12 is filling the fuel rail 32 with pressurised hydrogen gas via the first tank outlet non-return valve 34. The second tank 14 is in a "waiting phase", now full with pressurised hydrogen gas, and with the second tank outlet non-return valve 36 closed so that hydrogen gas cannot escape the second tank 14. The supply inlet non-return valve 21 is closed (as the system is detached from the filling station) and the first and second tank inlet non-return valves 22, 24 are also closed.

The first inlet one-way valve 54 of the first tank 12 is opened by the ECU 62 so that oil within the auxiliary tank 46 is able to flow, via the pump 48, into the first tank 12. As a result of the incoming oil flow, the first tank membrane 40 is displaced upwardly (in the illustration shown), reducing the volume of the available space for hydrogen gas and causing the pressure of the hydrogen gas within the tank 12 to increase above the pressure of the hydrogen gas in the common outlet line and the fuel rail. As a result, the first tank outlet non-return valve 34 in the outlet line 26 is caused to open to discharge hydrogen gas from the first tank 12 into the common outlet line 30 to the fuel rail 32. This is described as the "delivery phase" for the first tank 12 as hydrogen gas is delivered into the fuel rail 32 and enables the supply of hydrogen gas to the injectors once the pressure in the tank array, the common outlet line and the fuel rail has reached the injection pressure, $P_i$. In FIG. 2 it can be seen that the oil is starting to empty from the auxiliary tank 46 during this phase, displacing the hydrogen gas from the first tank 12 to the fuel rail 32.

While the first tank is in the delivery phase, the second tank is in a "waiting phase", still full with pressurised hydrogen gas at the injection pressure $P_i$. The non-return aspect of the second tank outlet non-return valve prevents the hydrogen in the common outlet line entering the second tank, despite being at a higher pressure than the hydrogen in the second tank. The supply inlet non-return valve is closed (as the system is detached from the filling station) and the first and second tank inlet non-return valves are also closed.

Figure 3:
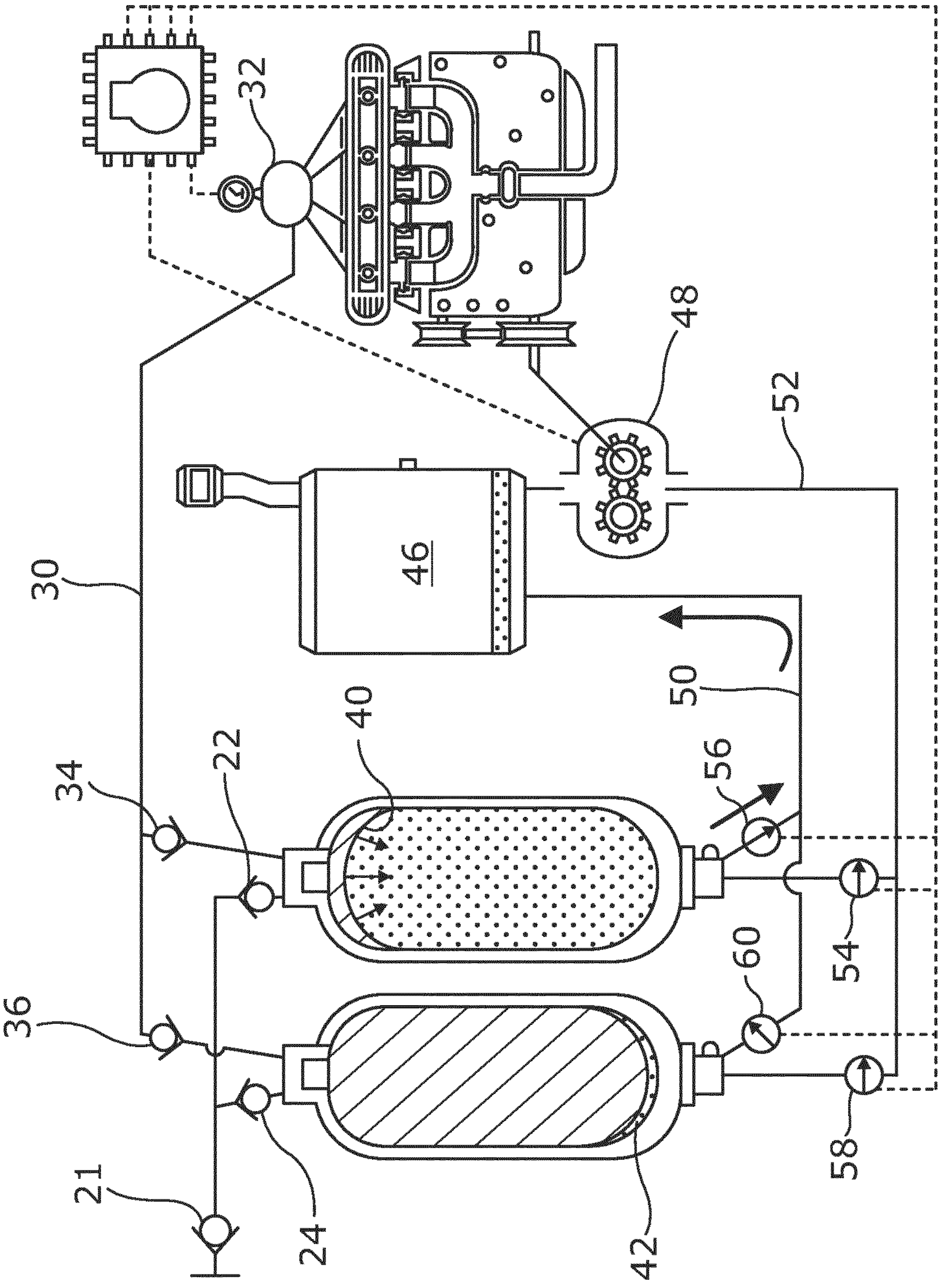

Referring to FIG. 3, the first tank 12 has been depleted of hydrogen gas and is near fully-filled with oil. The first tank 12 then enters an "oil discharge phase" during which the first inlet one-way valve 54 to the first tank is closed by the ECU 62 to prevent the further supply of oil through the auxiliary control fluid supply line 52 to the first tank 12, and the first outlet one-way valve 56 from the first tank 12 is opened to allow the oil within the first tank 12 to be discharged back to the auxiliary tank 46 via the auxiliary control fluid return line 50. The oil, having been pressurised by the pump 48 before entering the first tank 12, flows out of the first tank 12 under its own pressure as the auxiliary tank 46 is not pressurised and so a pressure gradient exists between the first tank 12 and the auxiliary tank 46. Both the second inlet one-way valve 58 and the second outlet one-way valve 60 remain closed at this time so the status of the second tank 14 does not change during the oil discharge phase of the first tank 12.

With the first tank 12 depleted of hydrogen gas, the first tank outlet non-return valve 34 closes, under the pressure of hydrogen gas within the common supply line 30, to prevent any return flow of hydrogen gas into the first tank 12. Hydrogen gas within the outlet line 30 and the fuel rail 32 is therefore unable to return to the first tank 12. In summary, the first tank outlet non-return valve 34 is only open when the first tank 12 is being charged with auxiliary fluid.

It will be appreciated by the skilled person that, with the first tank outlet non-return valve 34 closed, the discharge of the auxiliary fluid back into the auxiliary tank leaves the first tank 12 substantially empty, save for some small amount of residual hydrogen gas. However, the residual pressure existing in the first tank 12 when the auxiliary fluid has been fully discharged still exceeds atmospheric pressure.

Figure 4:
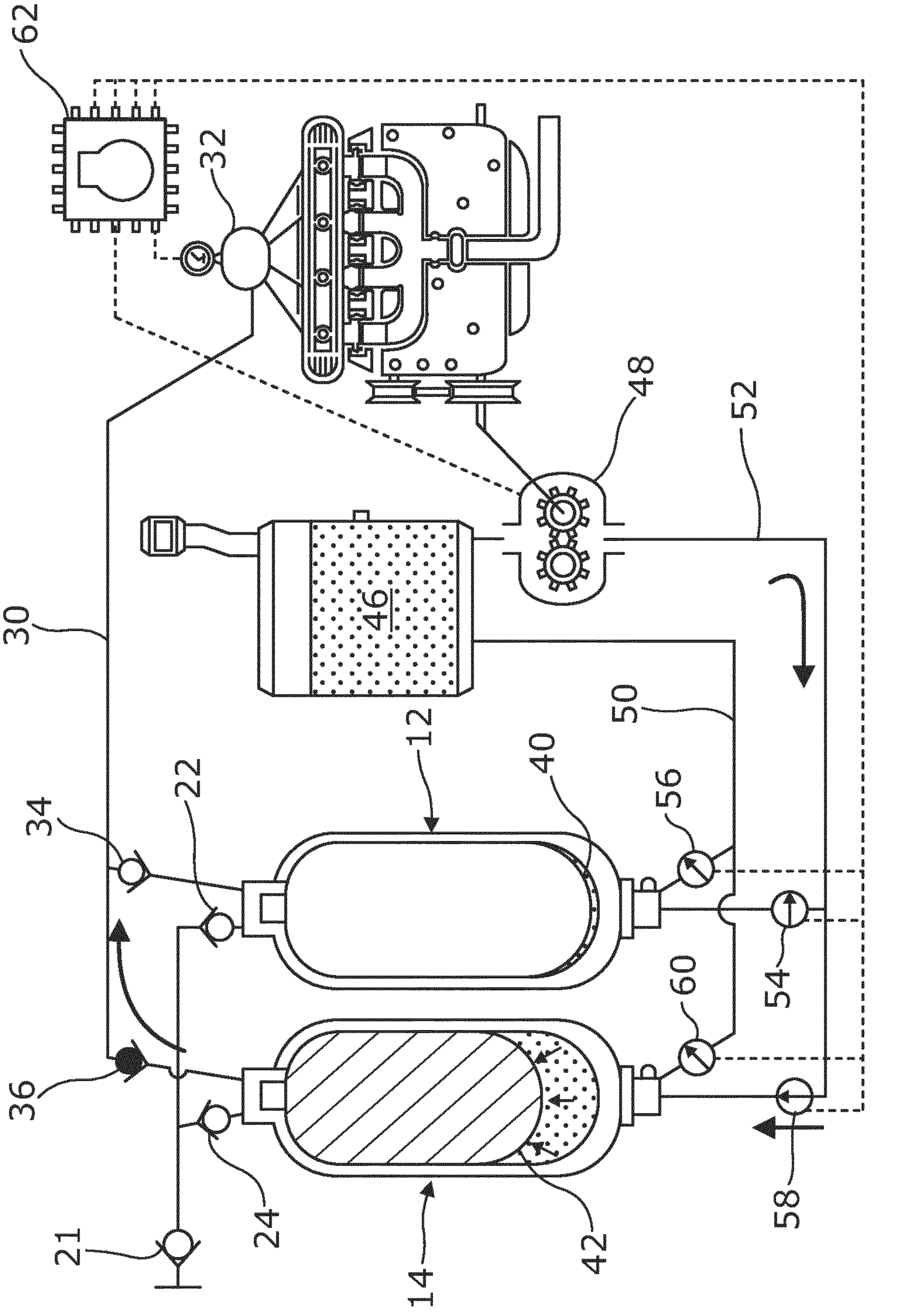

Referring now to FIG. 4, with the first tank 12 depleted of hydrogen gas, subsequent delivery of hydrogen gas to the common rail must be made by the second tank. However, the pressure of the hydrogen gas within the second tank 14 is still at the injection pressure $P_i$, as a result of the initial discharge of hydrogen gas to the common outlet line and fuel rail immediately after the tank array was refilled. In this subsequent method step, hydrogen gas from the second tank 14 is discharged through the common outlet line 30 to the fuel rail 32 as a result of oil being delivered through the second inlet one-way valve 58, in the same way as in FIG. 2 for the first tank 12. As a result of the incoming oil flow from the auxiliary tank 46, the second membrane 42 within the second tank 14 is displaced upwardly (in the illustration shown), reducing the volume of the available space for the hydrogen gas and causing the pressure of the hydrogen gas within the second tank 14 to increase above the pressure of the hydrogen gas in the common outlet line and the fuel rail. This causes the pressure of the hydrogen gas within the second tank 14 to increase and forcing the second tank outlet non-return valve 36 to open to discharge hydrogen gas from the second tank 14 into the common outlet line 30. This is described as the "delivery phase" for the second tank 14 as hydrogen gas is delivered into the fuel rail 32 through the common outlet line 30. As discussed above, in this delivery phase of the second tank 14 the first tank 12 is already fully discharged of hydrogen gas. Throughout the delivery phase of the second tank 14 the first inlet one-way valve 54 is maintained in the closed position. Likewise, the first outlet one-way valve 56 remains closed.

In an alternative step to that described above, it is possible for the discharge of oil from the first tank 12 to the auxiliary tank to be implemented at the same time as oil is delivered to the second tank 14 to displace hydrogen gas from the second tank 14 to the fuel rail 32. For this to occur, the ECU 62 sends a control signal to the second inlet one-way valve 58 of the second tank 14 to cause it to open at the same time as the first outlet one-way valve 56 of the first tank 12 is opened to return oil to the auxiliary tank 46. This process will be described in further detail below.

Figure 5:
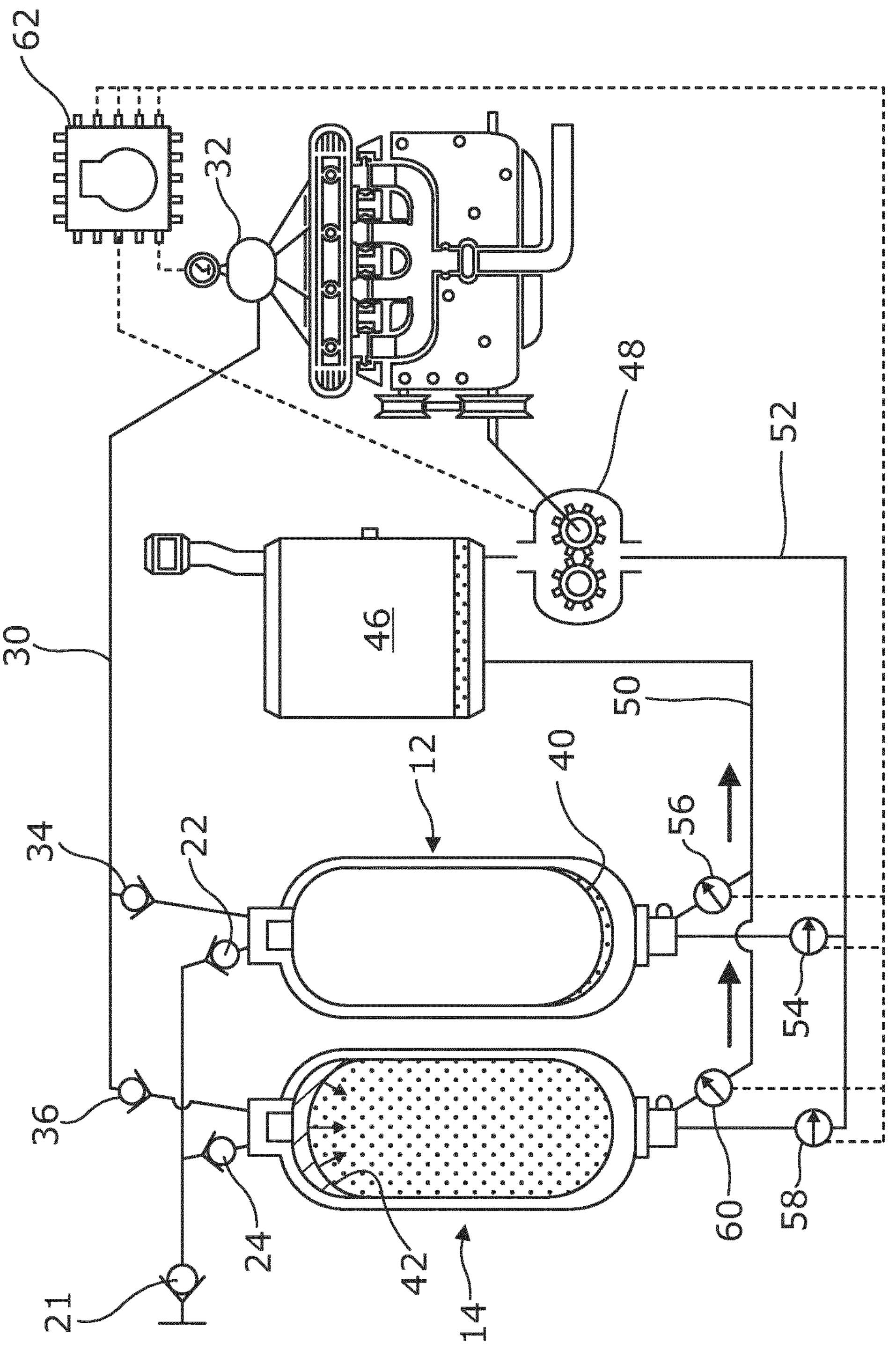

FIG. 5 shows the situation where the hydrogen gas within the second tank 14 is fully depleted, at which point the second tank outlet non-return valve 36 is caused to close (due to the pressure of hydrogen within the supply line 30 to the fuel rail 32). Hydrogen gas within the fuel rail 32 is therefore unable to return to the second tank 14. Also, the second outlet one-way valve 60 is operated to open so as to allow the oil within the second tank 14 to start to discharge back to the auxiliary tank 46, in the same way as described above for the first tank 12 with reference to FIG. 3. Both the first inlet one-way valve 54 and first outlet one-way valve 56 of the first tank 12 remain closed during this phase. As with the first tank 12, once the oil has been fully discharged from the second tank 14 back to the auxiliary tank 46, the second tank 14 is left substantially empty of hydrogen gas, with only a small residual amount of hydrogen gas left inside the tank 14 at a residual pressure exceeding atmospheric pressure.

The system provides an efficient way of discharging pressurised hydrogen gas, at a pressure in excess of atmospheric pressure, to the internal combustion engine, using convenient control of a valve arrangement controlling the supply of auxiliary fluid into the tanks.

Figure 6:
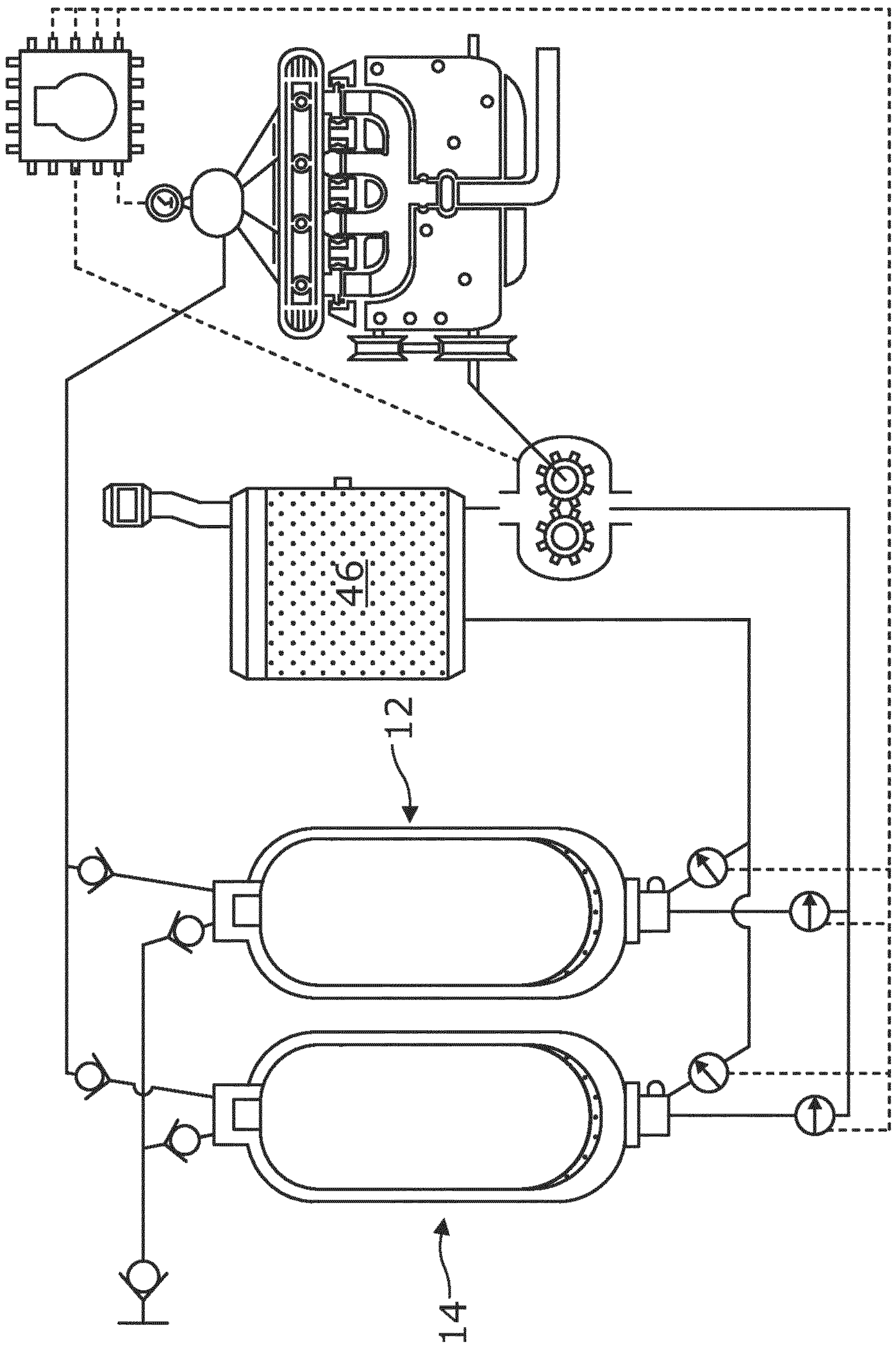

Referring to FIG. 6, once the first tank 12 and the second tank 14 have been fully discharged of hydrogen gas, the system requires re-filling at the filling station (as in FIG. 1). The system may also be re-filled with hydrogen gas when either one or both of the tanks 12, 14 are partially emptied, depending on the convenience of the user.

Figure 7:
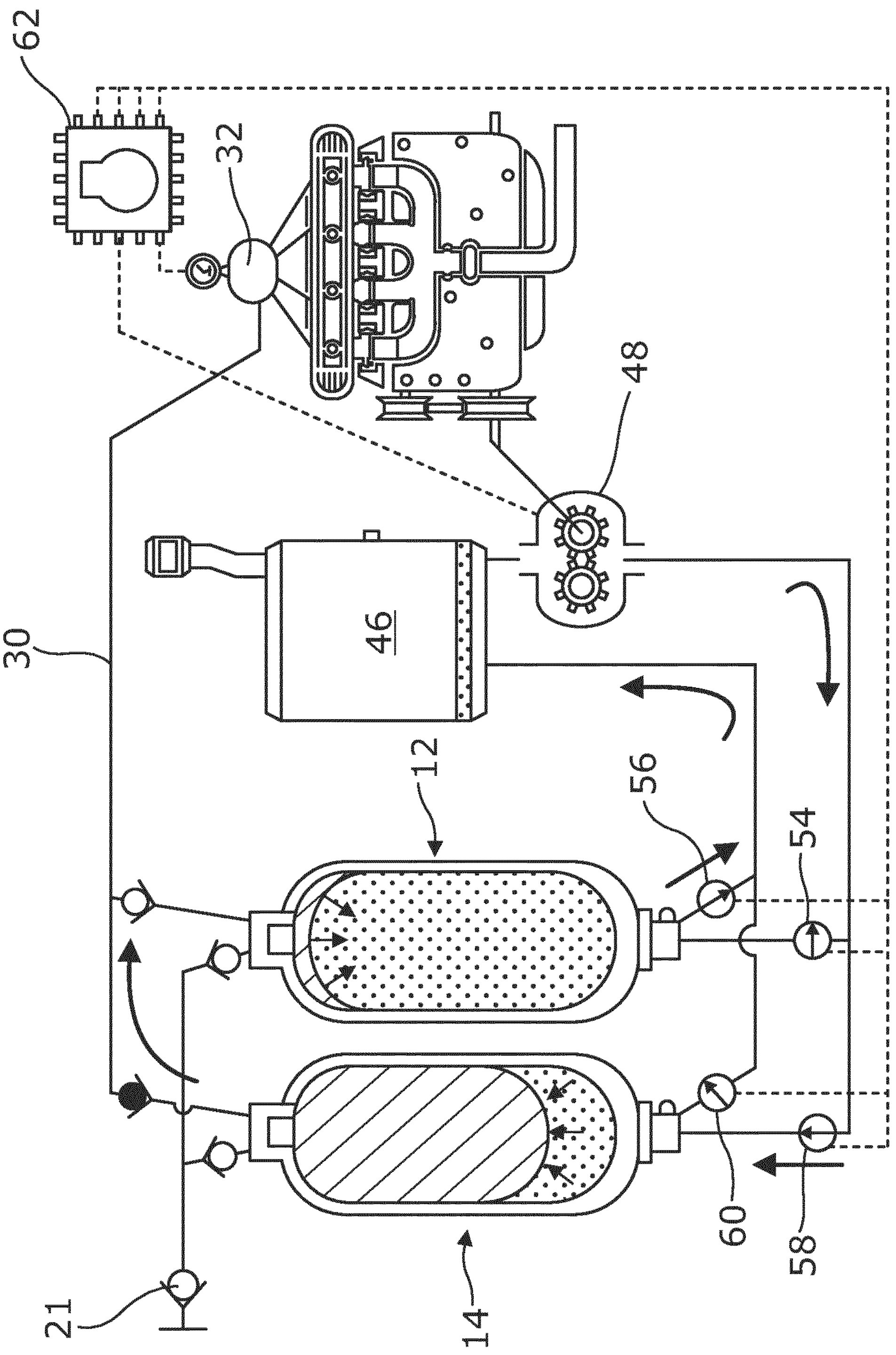
FIG. 7 is a schematic illustration of the fuel system to illustrate an alternative method step of operation of the fuel system in FIG. 1.

As referred to previously, FIG. 7 shows the alternative method of operating the fuel system whereby the discharge of the oil from the first tank 12 is carried out while the oil is filling the second tank 14 to discharge hydrogen gas to the supply line 30 from the second tank. In this situation the first outlet one-way valve 56 is opened by the ECU 62 to allow the discharge of oil back to the auxiliary tank 14, during the same phase as, or simultaneously with, the second inlet one-way valve 58 being opened by the ECU 62 to allow the oil to charge the second tank 14, displacing hydrogen from the second tank 14 for supply to the supply line 30. Hence, in FIG. 7, both the first outlet one-way valve 56 and the second inlet one-way valve 58 are opened at the same time or during the same phase. The first outlet one-way valve 56 and the second inlet one-way valve 58 need not be operated exactly simultaneously, although they could be, but it is the case that the second inlet one-way valve 58 is opened at some stage for which the first outlet one-way valve 56 is opened. The timing of operation of the valves must ensure that sufficient oil has been discharged from the first tank 12 as the second inlet one-way valve 58 is opened.

Figure 8:
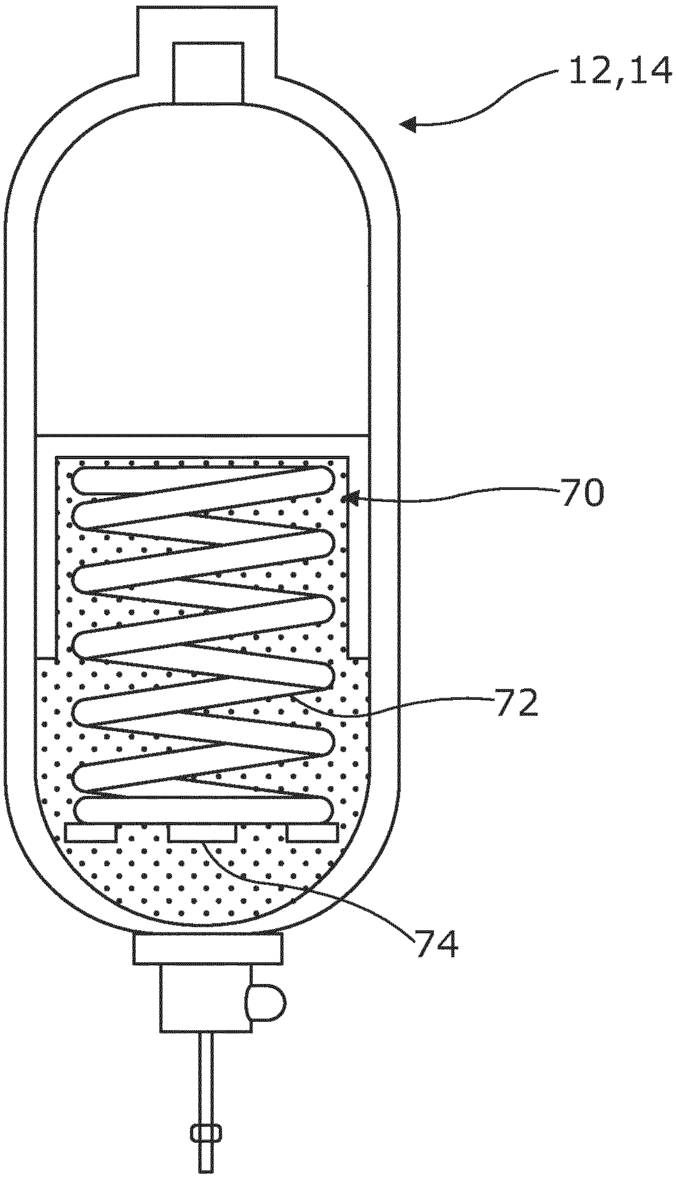
FIG. 8 is a schematic illustration of a piston arrangement for use in the fuel system in FIG. 1.

FIG. 8 shows different arrangement for use in either the first tank or the second tank, or ideally both tanks. In this case the separation member to separate the auxiliary fluid and the hydrogen gas takes the form of a sealed, spring-biased piston 70. The piston 70 is U-shaped in cross section and is slidable within the cavity of the tank 12, 14 depending on the amount of auxiliary fluid that is suppled to the tank 12, 14 via the auxiliary fluid supply line. A spring 72 is provided to bias the piston upwards (in the illustration shown). An upper end of the spring 72 acts on an internal surface of the U-shaped piston and a lower surface of the spring acts on an abutment member 74 located in a lower region of the tank 12, 14. The abutment member 74 is provided with one or more openings to ensure the auxiliary fluid can flow through the abutment member freely.

When the system is connected to the filling station (as in FIG. 1), and the tank 12, 14 is filled with hydrogen gas, the piston is caused to move downwardly within the cavity of the tank, compressing the spring 74. This means that when auxiliary control fluid is supplied to the tank 12, 14 to discharge hydrogen gas from the tank 12, 14 to the common supply line 30, the potential energy retained in the spring, assists the discharge process. As a result, there is a lesser demand on the pump 48 to pressurise the auxiliary control fluid when it is required to discharge hydrogen gas from the tank 12, 14, therefore benefitting the overall efficiency of the system. In other embodiments, the spring may be replaced with other biasing means (e.g. a bellows arrangement) capable of storing energy during the filling process, from the supply of hydrogen gas, which is later used to assist the discharging of the hydrogen gas when the tank 12, 14 is filled with auxiliary fluid.

It will be appreciated that various other embodiments of the invention are also envisaged without departing from the scope of the appended claims. For example, the system has been described principally with reference to a supply of gaseous fuel to an onboard internal combustion energy of a vehicle, but it will be appreciated that other vehicle applications are envisaged, including fuel cell applications where the fuel system is used to supply hydrogen gaseous fuel to a cell as opposed to a rail for hydrogen gas storage. The invention is also applicable to other types of gas, and not just hydrogen gas. For example, the fuel system may provide a supply of compressed natural gas to a power plant, for example an engine, of a vehicle.

The invention claimed is:

1. An onboard fuel system for supplying gaseous fuel to an onboard power plant of a vehicle, the fuel system comprising:

at least a first tank onboard the vehicle and configured to receive pressurized gaseous fuel for supply to the power plant, in use;

a source of auxiliary control fluid for supply to the first tank; and a valve arrangement which is operable to control the supply of auxiliary control fluid to the first tank so as to control the discharge of the gaseous fuel from the first tank;

wherein the first tank includes a movable separation element for separating the auxiliary control fluid from the gaseous fuel within the first tank and at least the first tank is provided with a biasing means which acts on the separation element to oppose movement thereof during a filling phase of the fuel system so as to store energy within the biasing means for use during a discharge phase of gas from the first tank;

further comprising an auxiliary control fluid supply line between the source of auxiliary control fluid and at least the first tank, and wherein the auxiliary control fluid supply line is provided with a pressurizing means to pressurize the supply of auxiliary fluid to at least the first tank.

2. The fuel system as claimed in claim 1, comprising at least one further tank configured to receive pressurised gaseous fuel, and wherein the valve arrangement is operable to control the supply of auxiliary fluid to the or each further tank so as to control the discharge of the gaseous fuel from the or each further tank.

3. The fuel system as claimed in claim 2, wherein the valve arrangement includes, for each of the first and further tanks, an inlet one-way valve for controlling the supply of auxiliary control fluid to the associated tank and an outlet one-way valve for controlling the supply of auxiliary control fluid from the associated tank to an auxiliary control fluid reservoir.

4. The fuel system as claimed in claim 1, wherein the separation element includes any one of a membrane, a bladder, a diaphragm, a piston or a bellows arrangement.

5. The fuel system as claimed in claim 1, wherein the power plant is an internal combustion engine of a vehicle.

6. The fuel system as claimed in claim 1, wherein the gaseous fuel is hydrogen.

7. A method of delivering hydrogen gas from an onboard tank array to an onboard power plant of a vehicle, the tank array comprising at least a first tank onboard the vehicle and containing pressurized gaseous fuel, the method comprising controlling a valve arrangement to control the supply of auxiliary control fluid to the first tank so as to cause discharge of the gaseous fuel from the first tank whilst maintaining separation between the auxiliary fluid and the gaseous fuel within the first tank by means of a movable separation element, wherein at least the first tank is provided with a biasing means which acts on the separation element to oppose movement thereof during a filling phase of the fuel system so as to store energy within the biasing means for use during a discharge phase of gas from the first tank;

further comprising an auxiliary control fluid supply line between the source of auxiliary control fluid and at least the first tank, and wherein the auxiliary control fluid supply line is provided with a pressurizing means to pressurize the supply of auxiliary fluid to at least the first tank.

* * * * *